(12) United States Patent
Wan et al.

(10) Patent No.: US 12,056,444 B2
(45) Date of Patent: Aug. 6, 2024

(54) TABLE PROCESSING METHOD AND APPARATUS, DEVICE AND STORAGE MEDIUM

(71) Applicant: BEIJING BYTEDANCE NETWORK TECHNOLOGY CO., LTD., Beijing (CN)

(72) Inventors: Shiqi Wan, Beijing (CN); Xinxin Zhang, Beijing (CN)

(73) Assignee: BEIJING BYTEDANCE NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/826,486

(22) Filed: May 27, 2022

(65) Prior Publication Data
US 2022/0284181 A1    Sep. 8, 2022

Related U.S. Application Data

(63) Continuation-in-part of application No. PCT/CN2021/075906, filed on Feb. 8, 2021.

(30) Foreign Application Priority Data

Feb. 11, 2020  (CN) .......................... 202010086796.2

(51) Int. Cl.
*G06F 16/26* (2019.01)
*G06F 3/04845* (2022.01)
(Continued)

(52) U.S. Cl.
CPC ........ *G06F 40/177* (2020.01); *G06F 3/04845* (2013.01); *G06F 3/04855* (2013.01); *G06F 16/26* (2019.01)

(58) Field of Classification Search
CPC .... G06F 40/177; G06F 16/26; G06F 3/04845; G06F 3/04855
See application file for complete search history.

(56) References Cited

U.S. PATENT DOCUMENTS 6,988,241 B1 * 1/2006 Guttman ............. G06F 16/9566
707/E17.115
7,962,522 B2 * 6/2011 Norris, III ............ G06F 40/143
715/252
(Continued)

FOREIGN PATENT DOCUMENTS

CN          1815478 A       8/2006
CN        102981699 A       3/2013
(Continued)

OTHER PUBLICATIONS

International Search Report issued May 6, 2021 in International Application No. PCT/CN2021/075906.
(Continued)

*Primary Examiner* — Tadesse Hailu
(74) *Attorney, Agent, or Firm* — Faegre Drinker Biddle & Reath LLP

(57) ABSTRACT

Provided are a table processing method and apparatus, a device and a storage medium. The method includes determining the proportion of the display area of a frozen area to the display area of a table area, where the table area includes the frozen area and a non-frozen area; and when the proportion is larger than a proportion threshold, shrinking the display area of the frozen area and enlarging the display area of the non-frozen area, where the proportion of the shrunk display area of the frozen area to the display area of the table area is equal to the proportion threshold.

14 Claims, 3 Drawing Sheets

Determine the proportion of the display area of a frozen area to the display area of a table area, where the table area includes the frozen area and a non-frozen area — S101

When the proportion is larger than a proportion threshold, shrink the display area of the frozen area and enlarge the display area of the non-frozen area, where the proportion of the shrunk display area of the frozen area to the display area of the table area is equal to the proportion threshold — S102

(51) Int. Cl.
 *G06F 3/04855* (2022.01)
 *G06F 40/177* (2020.01)

(56) References Cited

U.S. PATENT DOCUMENTS

| | | | | |
|---|---|---|---|---|
| 9,760,271 | B2* | 9/2017 | Persaud | G06F 40/106 |
| 10,120,852 | B2* | 11/2018 | Goto | G06F 40/177 |
| 11,854,076 | B2* | 12/2023 | Lambert | G06Q 40/03 |
| 2003/0051209 | A1 | 3/2003 | Androski et al. | |
| 2004/0068429 | A1* | 4/2004 | MacDonald | G06Q 30/0201 |
| | | | | 705/7.29 |
| 2004/0139208 | A1* | 7/2004 | Tuli | G06F 16/9577 |
| | | | | 709/230 |
| 2005/0154974 | A1* | 7/2005 | Gao | G06F 40/18 |
| | | | | 715/255 |
| 2006/0129474 | A1* | 6/2006 | Kelly | G06Q 40/04 |
| | | | | 705/37 |
| 2006/0150078 | A1* | 7/2006 | Brookler | G06F 40/103 |
| | | | | 715/228 |
| 2008/0082938 | A1* | 4/2008 | Buczek | G06F 40/18 |
| | | | | 715/227 |
| 2009/0083614 | A1* | 3/2009 | Wedekind | G06F 40/18 |
| | | | | 715/217 |
| 2009/0144607 | A1* | 6/2009 | Chen | G06F 40/177 |
| | | | | 715/227 |
| 2009/0187815 | A1* | 7/2009 | Becerra, Sr. | G06F 16/283 |
| | | | | 715/212 |
| 2009/0313537 | A1* | 12/2009 | Fu | G06F 16/00 |
| | | | | 715/201 |
| 2011/0107196 | A1* | 5/2011 | Foster | G06F 40/177 |
| | | | | 715/227 |
| 2012/0151317 | A1* | 6/2012 | Ho | G06F 40/18 |
| | | | | 715/217 |
| 2013/0086464 | A1* | 4/2013 | Thangappan | G06F 40/177 |
| | | | | 715/227 |
| 2016/0026356 | A1* | 1/2016 | Persaud | G06F 3/0485 |
| | | | | 715/212 |
| 2016/0378326 | A1* | 12/2016 | Svinth | G06F 40/18 |
| | | | | 715/784 |

FOREIGN PATENT DOCUMENTS

| | | |
|---|---|---|
| CN | 105677624 A | 6/2016 |
| CN | 107544952 A | 1/2018 |
| CN | 119068987 A | 4/2020 |
| CN | 111309798 A | 6/2020 |
| CN | 107544952 B | 1/2022 |
| JP | H10261039 A | 9/1998 |

OTHER PUBLICATIONS

CN Search Report issued Feb. 27, 2023 in CN Appl. No. 202010086796.2, English Translation (7 pages).
CN Office Action issued Mar. 6, 2023 in CN Appl. No. 202010086796.2, English Translation (13 pages).
Liu Jian-zhi, Discussing The Application of Excel In Student Score Management, Computer Knowledge And Technology, vol. 3, No. 7, Sep. 2008, pp. 1608-1610, English Translation of Abstract only.
European Search Report issued May 26, 2023 in European Application No. 21754497.2 (4 pages).
"Freeze or Lock Specific Rows and Columns when Scrolling in Excel," Jan. 13, 2016, pp. 1-4, XP093047621, Retrieved from the Internet: URL:http://web.archive.org/web/20160113231723/https://www.teachexcel.com/excel-tutorial/freeze-or-lock-specific-rows-and-columns-when-scrolling-in-excel1482.html (4 pages).
Notice of Reasons for Refusal issued Oct. 3, 2023 in Japanese Application No. 2022-548604, English translation (8 Pages).

* cited by examiner

| Name | Gender | | |
|---|---|---|---|
| ** | ** | | |
| ** | ** | | |
| ** | ** | | |
| ** | ** | | |
| | | | |
| | | | |
| | | | |
| | | | |
| | | | |
| | | | |
| | | | |
| | | | |
| Frozen row | | — 0 + | |
| | | | |
| Frozen column | | — 0 + | |
| | | | |
| | | | |
| | | | |

TABLE PROCESSING METHOD AND APPARATUS, DEVICE AND STORAGE MEDIUM

CROSS-REFERENCE TO RELATED APPLICATION(S)

This is a continuation-in-part of International Patent Application No. PCT/CN2021/075906, filed Feb. 8, 2021, which claims priority to Chinese Patent Application No. 202010086796.2 filed with the China National Intellectual Property Administration (CNIPA) on Feb. 11, 2020, the disclosures of which are incorporated herein by reference in their entirety.

TECHNICAL FIELD

Embodiments of the present application relate to the field of table processing technologies, for example, a table processing method and apparatus, a device and a storage medium.

BACKGROUND

Spreadsheets are indispensable tools for processing data in people's daily work. As people's needs change, online spreadsheets can support multi-person collaboration and save editing results in real time in the cloud. Thus, online spreadsheets are widely used in the market.

Using an online spreadsheet as an example, when there is a large amount of data in the online spreadsheet, to facilitate viewing of the data in the spreadsheet, it is generally possible to set a column freeze on the online spreadsheet. However, the data viewing efficiency of the traditional way is still low.

SUMMARY

The present application provides a table processing method and apparatus, a device and a storage medium to solve a technical problem that the data viewing efficiency of the traditional way is still low.

An embodiment of the present application provides a table processing method. The method includes determining the proportion of the display area of a frozen area to the display area of a table area, where the table area includes the frozen area and a non-frozen area; and when the proportion is larger than a proportion threshold, shrinking the display area of the frozen area and enlarging the display area of the non-frozen area, where the proportion of the shrunk display area of the frozen area to the display area of the table area is equal to the proportion threshold.

An embodiment of the present application provides a table processing apparatus. The device includes a determination module and a first processing module. The determination module is configured to determine the proportion of the display area of a frozen area to the display area of a table area, where the table area includes the frozen area and a non-frozen area. The first processing module is configured to, when the proportion is larger than a proportion threshold, shrink the display area of the frozen area and enlarge the display area of the non-frozen area, where the proportion of the shrunk display area of the frozen area to the display area of the table area is equal to the proportion threshold.

An embodiment of the present application provides an electronic device. The device includes a memory and a processor. The memory is configured to store a computer program. The processor, when executing the computer program, implements the following steps: determining the proportion of the display area of a frozen area to the display area of a table area, where the table area includes the frozen area and a non-frozen area; and when the proportion is larger than a proportion threshold, shrinking the display area of the frozen area and enlarging the display area of the non-frozen area, where the proportion of the shrunk display area of the frozen area to the display area of the table area is equal to the proportion threshold.

An embodiment of the present application provides a computer-readable storage medium which is configured to store a computer program. When executed by a processor, the computer program implements the following steps: determining the proportion of the display area of a frozen area to the display area of a table area, where the table area includes the frozen area and a non-frozen area; and when the proportion is larger than a proportion threshold, shrinking the display area of the frozen area and enlarging the display area of the non-frozen area, where the proportion of the shrunk display area of the frozen area to the display area of the table area is equal to the proportion threshold.

BRIEF DESCRIPTION OF DRAWINGS

Same or similar reference numerals in the drawings denote same or similar elements. It is to be understood that the drawings are illustrative and that originals and elements are not necessarily drawn to scale.

DETAILED DESCRIPTION

Embodiments of the present disclosure will be described below with reference to the drawings. The drawings illustrate some embodiments of the present disclosure, but it should be understood that the present disclosure may be implemented in various manners. It should be understood that the drawings and embodiments of the present disclosure are merely illustrative.

It is to be understood that the various steps recorded in the method embodiments of the present disclosure may be performed in a different order, and/or in parallel. In addition, the method embodiments may include additional steps and/or omit execution of illustrated steps.

As used herein, the term "comprise" and variations thereof are intended to be inclusive, that is, "including, but not limited to". The term "based on" is "at least partially based on". The term "an embodiment" refers to "at least one embodiment"; the term "another embodiment" refers to "at least one another embodiment"; the term "some embodiments" refers to "at least some embodiments". Related definitions of other terms are given in the description hereinafter.

Concepts such as "first" and "second" in the present disclosure are merely intended to distinguish one from another apparatus, module, or unit.

References to modifications of "one" or "a plurality" mentioned in the present disclosure are intended to be illustrative; those skilled in the art should understand that "one" or "a plurality" should be understood as "one or more" unless clearly expressed in the context.

The names of messages or information exchanged between multiple apparatuses in the embodiments of the present disclosure are only for illustrative purposes.

It is to be noted that the execution subject may be a table freezing apparatus in the method embodiment described below, and the apparatus may be implemented as part or all of the electronic devices by means of software, hardware, or a combination of software and hardware. The method embodiment below is illustrated by using an example in which the execution subject is the electronic device.

Figure 1:
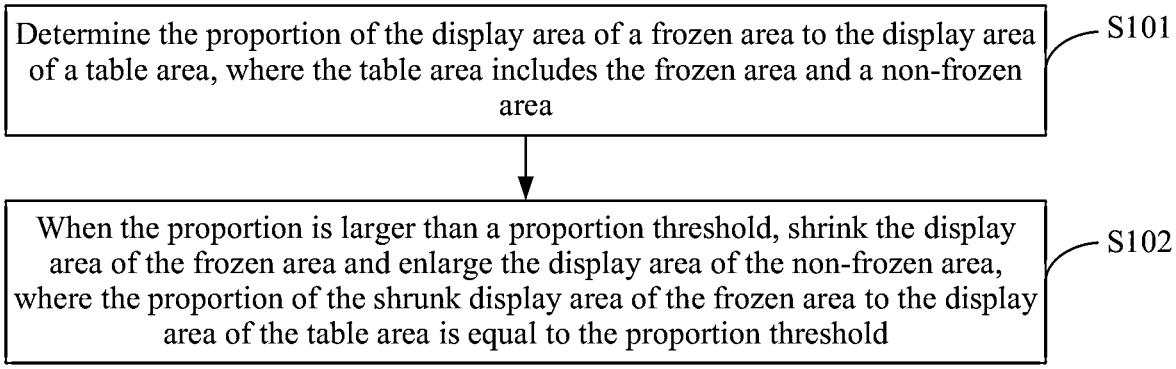
FIG. 1 is a flowchart of a table processing method according to an embodiment of the present application.

FIG. 1 is a flowchart of a table processing method according to an embodiment. This embodiment relates to a process of how an electronic device displays the frozen area of a table. As shown in FIG. 1, the method includes steps described below.

In step S101, the proportion of the display area of a frozen area to the display area of a table area is determined, where the table area includes the frozen area and a non-frozen area.

Optionally, the frozen area is a data area selected from the table area by a user, and the display area of the table area is an area of the table area currently displayed in a screen.

To facilitate a user to view the data of a table, it is generally possible to freeze the table. When one or more rows is frozen in a table, a row freeze line appears in the table. The row freeze line coincides with a horizontal row divide line. The area above the row freeze line is a frozen area.

When one or more columns is frozen in a table, a column freeze line appears in the table. The column freeze line coincides with a vertical column divide line. The area on the left of the column freeze line is a frozen area. When multiple rows and multiple columns are frozen in a table, a row freeze line and a column freeze line appear in the table. The union of the area above the row freeze line and the area on the left of the column freeze line is a frozen area. The table area is an area containing data in the table and includes a frozen area and a non-frozen area.

In an optional implementation, the above S101 may be: determine the proportion of the display area of the frozen area to the display area of the table area according to the number of lines included in the display area of the frozen area and the number of lines included in the display area of the table area, where the number of lines is the number of rows or the number of columns.

It is to be understood that when the table is set with row freezing, the electronic device may acquire the number of rows included in the display area of the frozen area and the number of rows included in the display area of the table area. Moreover, according to the ratio of the number of rows included in the display area of the frozen area to the number of rows included in the display area of the table area, the electronic device may determine the proportion of the display area of the frozen area to the display area of the table area. When the table is set with column freezing, the electronic device may acquire the number of columns included in the display area of the frozen area and the number of columns included in the display area of the table area. Moreover, according to the ratio of the number of columns included in the display area of the table area, the electronic device may determine the proportion of the display area of the frozen area to the display area of the table area. When the table is set with row freezing and column freezing, the electronic device may acquire the number of rows and columns included in the display area of the frozen area and the number of rows and columns included in the display area of the table area. Moreover, according to the ratio of the number of rows included in the display area of the frozen area to the number of rows included in the display area of the table area and the ratio of the number of columns included in the display area of the frozen area to the number of columns included in the display area of the table area, the electronic device may determine the proportion of the display area of the frozen area to the display area of the table area.

Apparently, the electronic device may, according to the length and width of the display area of the frozen area and the length and width of the display area of the table area, determine the proportion of the display area of the frozen area to the display area of the table area. Moreover, the electronic device may also, according to the ratio of the resolution of the display area of the frozen area to the resolution of the display area of the table area, determine the proportion of the display area of the frozen area to the display area of the table area.

In step S102, when the proportion is larger than a proportion threshold, the display area of the frozen area is shrunk, and the display area of the non-frozen area is enlarged, where the proportion of the shrunk display area of the frozen area to the display area of the table area is equal to the proportion threshold.

The preceding proportion threshold is preset, and the proportion threshold may be set according to experience. After obtaining the proportion of the display area of the frozen area to the display area of the table area, the electronic device determines whether the preceding proportion is greater than the preset proportion threshold. When the proportion is greater than the proportion threshold, the display area of the frozen area is shrunk, and the display area of the non-frozen area is enlarged. When the preceding proportion is less than or equal to the proportion threshold, the display area of the frozen area and the display area of the non-frozen area are not changed in size.

The shrunk display area of the frozen area is less than the frozen area, therefore, the shrunk display area of the frozen area cannot completely display the content contained in the frozen area. In this case, a scrollbar may be provided in the display area of the frozen area. Through monitoring the movement operation of the scrollbar by the user, the content contained in the frozen area is correspondingly displayed, according to the movement operation, in the display area of the frozen area. Thus, the user can view the data contained in the frozen area through sliding the scrollbar.

In an optional implementation, the electronic device may inversely calculate the target length and the target width of the display area of the frozen area according to the proportion threshold, thereby adjusting the current length of the display area of the frozen area to the target length, and adjusting the current width of the display area of the frozen area to the target width, thereby shrinking the display area of the frozen area and enlarging the display area of the non-frozen area.

In another optional implementation, the preceding S102 may be: moving the divider line between the display area of the frozen area and the display area of the non-frozen area from a first position in the display area of the table area to a second position in the display area of the table area, where the first position is a position corresponding to the proportion, and the second position is a position corresponding to the proportion threshold; and adjusting the display area of the frozen area and the display area of the non-frozen area according to the moved divider line.

When the proportion of the display area of the frozen area to the display area of the table area is determined to be greater than the proportion threshold, the electronic device determines the target position (that is, the second position) of the divider line between the display area of the frozen area and the display area of the non-frozen area according to the proportion threshold, moves the divide line from the current position (that is, the first position) to the target position, and based on the moved divide line, adjusts the display area of the frozen area and the display area of the non-frozen area. Exemplarily, when the table is set with row freezing, based on the moved divide line, the adjusted display area of the frozen area is the area above the moved divide line. When the table is set with column freezing, based on the moved divide line, the adjusted display area of the frozen area is the area on the left of the moved divide line. When the table is set with row freezing and column freezing, based on the moved divide line, the adjusted display area of the frozen area is the union of the area above the moved divide line and the area on the left of the moved divide line.

Figure 2:
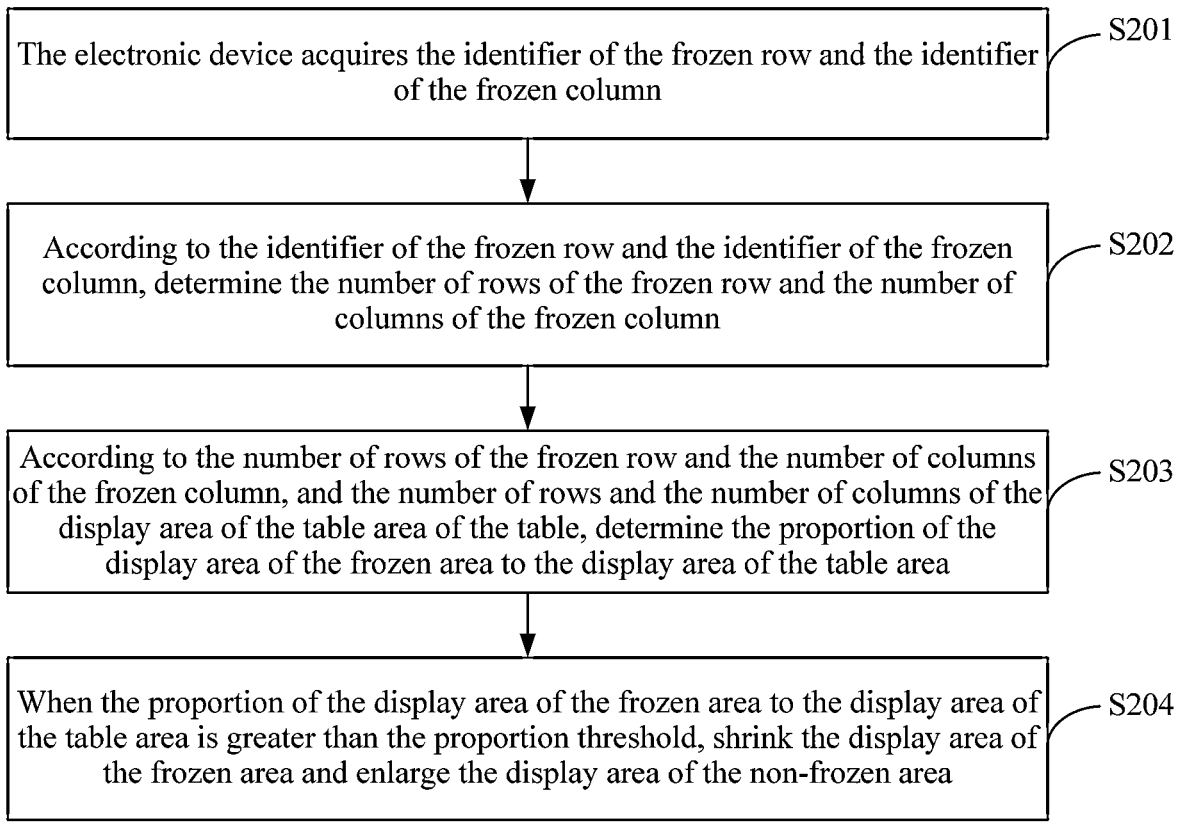
FIG. 2 is a flowchart of a table processing method according to another embodiment of the present application.

The following describes a processing method of the preceding table by using the scene when the table is frozen as an example, and only one implementation is described below. As shown in FIG. 2. the method includes steps S201 to S204.

In S201, the electronic device acquires the identifier of the frozen row and the identifier of the frozen column.

Figures 3, 4:
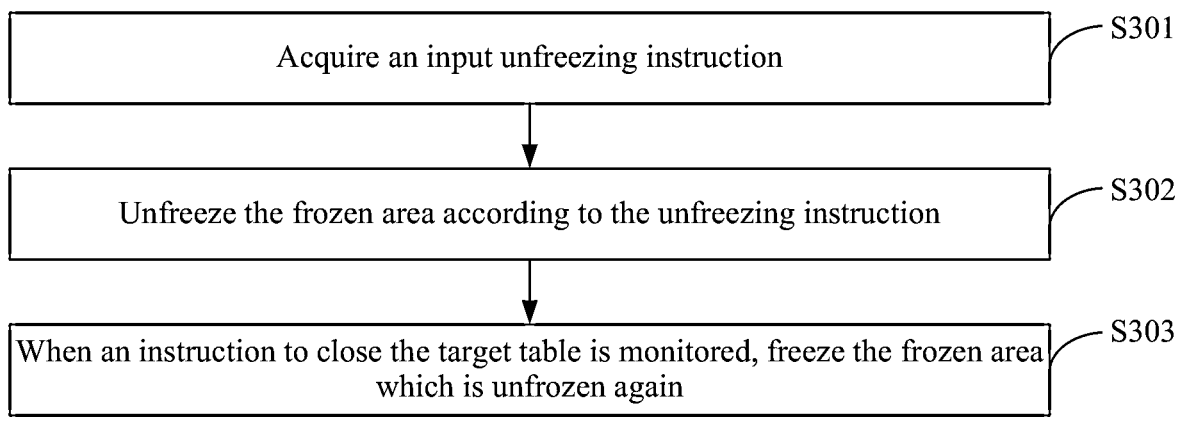
FIG. 3 is a diagram of a display interface of a target table according to an embodiment of the present application.
FIG. 4 is a flowchart of a table processing method according to another embodiment of the present application.

As shown in FIG. 3, the target table may be provided with selection controls "−" and "+" for freezing rows and selection controls "−" and "+" for freezing columns. When the user needs to set row freezing and/or column freezing on the data in the table area of the target table (the data in the table area includes the heading information "name" and "gender", and the content information "**" corresponds to the heading information), the user may click the control "−" or "+" to change the default value in the choice box (the default value is 0), thereby selecting the identifier of the frozen row and the identifier of the frozen column. Apparently, the electronic device may acquire the identifier of the frozen row and the identifier of the frozen column through the movement operation on the row frozen line on the target table by the user and the movement operation on the column frozen line on the target table by the user.

In step S202, according to the identifier of the frozen row and the identifier of the frozen column, the number of rows of the frozen row and the number of columns of the frozen column are determined.

In step S203, according to the number of rows of the frozen row and the number of columns of the frozen column, and the number of rows and the number of columns of the display area of the table area of the table, the proportion of the display area of the frozen area to the display area of the table area is determined.

In step S204, when the proportion of the display area of the frozen area to the display area of the table area is greater than the proportion threshold, the display area of the frozen area is shrunk, and the display area of the non-frozen area is enlarged.

When the electronic device is to open a table with a frozen area, similarly, the electronic device is to determine the proportion of the display area of the frozen area of the table to be opened to the display area of the table area. When the proportion is greater than the proportion threshold, and when a table with a frozen area is to be opened, the display area of the frozen area is directly shrunk, and the display area of the non-frozen area is enlarged so that the proportion of the frozen area to the table area displayed on the screen is equal to the proportion threshold.

In the table processing method provided by this embodiment, since the proportion threshold of the display area of the frozen area to the display area of the table area is preset, when the electronic device determines that the proportion of the display area of the frozen area to the display area of the table area is greater than the preset proportion threshold, the display area of the frozen area is shrunk, and the display area of the non-frozen area is enlarged so that the proportion of the shrunk display area of the frozen area and the display area of the table area is equal to the preset proportion threshold. In this manner, even if the number of frozen rows and/or columns of the target table is large, and the proportion of the display area of the frozen area to the display area of the table area of the target table is greater than the proportion threshold, the adjusted proportion of the display area of the frozen area to the display area of the table area is equal to the proportion threshold. With this configuration, the display area of the frozen area and the display area of the non-frozen area in the display area of the entire table area are divided in an appropriate proportion. Therefore, it is convenient for the user to view the data of the frozen area and the non-frozen area, thereby improving the data viewing efficiency.

The table may be a local table or an online table. When the table is an online table, in order to meet the data viewing needs of a user with multiple permissions, the user can be provided with a temporary unfreezing function, and the temporary unfreezing operation is not synchronized to the server. In this case, the processing may be performed with reference to the procedure of the following embodiment. As shown in FIG. 4, the method may further include the following steps.

In step S301, an input unfreezing instruction is acquired.

An unfreezing control may be provided to a user on the software interface. The user clicks the unfreezing control to cause the electronic device to acquire an unfreezing instruction. Alternatively, an unfreezing instruction may be acquired according to the movement operation of the user on the freeze line. For example, if the electronic device monitors that the user moves the freeze line out of the table area of the table, it can know that the user wants to unfreeze the table. Apparently, the electronic device may also obtain an unfreezing instruction through voice input by the user.

In step S302, the frozen area is unfrozen according to the unfreezing instruction.

Different users can unfreeze the table according to users' own data viewing needs. Meanwhile, to ensure that the temporary unfreezing operation is not synchronized to the server so as not to affect the use of other users, optionally, the method further includes step S303 after the step S302.

In step S303, when an instruction to close the target table is monitored, the frozen area which is unfrozen is frozen again.

When the table which is unfrozen is frozen again, the electronic device needs to determine the proportion of the display area of the frozen area to the display area of the table area. When the proportion is greater than the proportion threshold, the display area of the frozen area is shrunk, and the display area of the non-frozen area is enlarged so that the proportion of the frozen area to the table area displayed on the screen is equal to the proportion threshold, thereby ensuring the user viewing experience of the content in the frozen area and the non-frozen area.

In the table processing method provided by this embodiment, when acquiring an input unfreezing instruction, the electronic device may unfreeze the frozen area according to the unfreezing instruction. Moreover, when monitoring an instruction to close the target table, the electronic device may freeze the frozen area which is unfrozen again. In this manner, the electronic device can temporarily unfreeze the frozen area of the target table according to the need of a user and does not synchronize the temporary unfreezing operation to the server. When the user views the table next time, the temporary unfreezing automatically fails, thereby ensuring the temporary of unfreezing and improving the intelligence of human-computer interaction.

Since the proportion threshold of the display area of the frozen area to the display area of the table area is preset, when the electronic device opens the table with a frozen area and determines that the proportion of the display area of the frozen area and the display area of the table area in the table to be opened is greater than the preset proportion threshold, the display area of the frozen area is shrunk, and the display area of the non-frozen area is enlarged so that the proportion of the shrunk display area of the frozen area to the display area of the table area is equal to the preset proportion threshold. In this manner, even if the number of frozen rows and/or columns of the table to be opened is large, and the proportion of the display area of the frozen area to the display area of the table area of the table to be opened is greater than the proportion threshold, the adjusted proportion of the display area of the frozen area to the display area of the table area is equal to the proportion threshold. With this configuration, the display area of the frozen area and the display area of the non-frozen area in the display area of the entire table area are divided in an appropriate proportion. Therefore, it is convenient for the user to view the data of the frozen area and the non-frozen area, thereby improving the data viewing efficiency.

Figure 5:
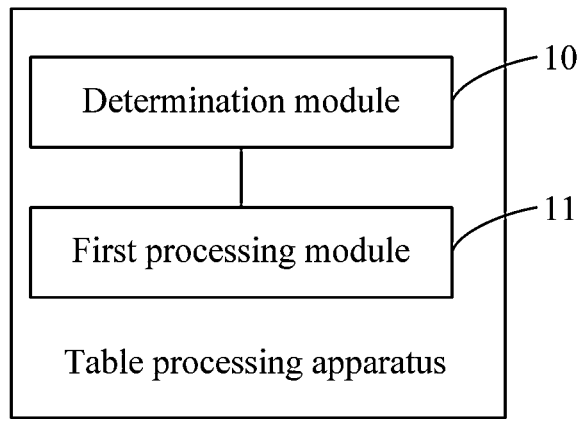
FIG. 5 is a diagram illustrating the internal structure of a table processing apparatus according to an embodiment of the present application.

FIG. 5 is a diagram illustrating the internal structure of a table processing apparatus according to an embodiment. As shown in FIG. 5, the device includes a determination module 10 and a first processing module 11.

The determination module 10 is configured to determine the proportion of the display area of a frozen area to the display area of a table area, where the table area includes the frozen area and a non-frozen area.

The first processing module 11 is configured to, when the proportion is larger than a proportion threshold, shrink the display area of the frozen area and enlarge the display area of the non-frozen area, where the proportion of the shrunk display area of the frozen area to the display area of the table area is equal to the proportion threshold.

In the table processing apparatus provided by this embodiment, since the proportion threshold of the display area of the frozen area to the display area of the table area is preset, when the electronic device determines that the proportion of the display area of the frozen area to the display area of the table area is greater than the preset proportion threshold, the display area of the frozen area is shrunk, and the display area of the non-frozen area is enlarged so that the proportion of the shrunk display area of the frozen area and the display area of the table area is equal to the preset proportion threshold. In this manner, even if the number of frozen rows and/or columns of the target table is large, and the proportion of the display area of the frozen area of the target table to the display area of the table area is greater than the proportion threshold, the adjusted proportion of the display area of the frozen area to the display area of the table area is equal to the proportion threshold. With this configuration, the display area of the frozen area and the display area of the non-frozen area in the display area of the entire table area are divided in an appropriate proportion. Therefore, it is convenient for the user to view the data of the frozen area and the non-frozen area, thereby improving the data viewing efficiency.

On the basis of the preceding embodiment, optionally, the first processing module 11 is configured to move the divider line between the display area of the frozen area and the display area of the non-frozen area from a first position in the display area of the table area to a second position in the display area of the table area; and adjust the display area of the frozen area and the display area of the non-frozen area according to the moved divider line, where the first position is a position corresponding to the proportion, and the second position is a position corresponding to the proportion threshold.

On the basis of the preceding embodiment, optionally, the display area of the frozen area includes a scrollbar, and the device further includes a second processing module.

The second processing module is configured to monitor the movement operation of the scrollbar, and in the display area of the frozen area, correspondingly display, according to the movement operation, the content contained in the frozen area.

On the basis of the preceding embodiment, optionally, the device further includes an acquiring module and a releasing module.

The acquiring module is configured to acquire an input unfreezing instruction.

The releasing module is configured to unfreeze the frozen area according to the unfreezing instruction.

On the basis of the preceding embodiment, optionally, the device further includes a freeze module.

The freeze module is configured to, when an instruction to close the target table is monitored, freeze the frozen area which is unfrozen again.

On the basis of the preceding embodiment, optionally, when the proportion is less than or equal to the proportion threshold, the display area of the frozen area and the display area of the non-frozen area are not changed in size.

On the basis of the preceding embodiment, optionally, the determination module 10 is configured to determine the proportion of the display area of the frozen area to the display area of the table area according to the number of lines included in the display area of the frozen area and the number of lines included in the display area of the table area, where the number of lines is the number of rows or the number of columns.

Figure 6:
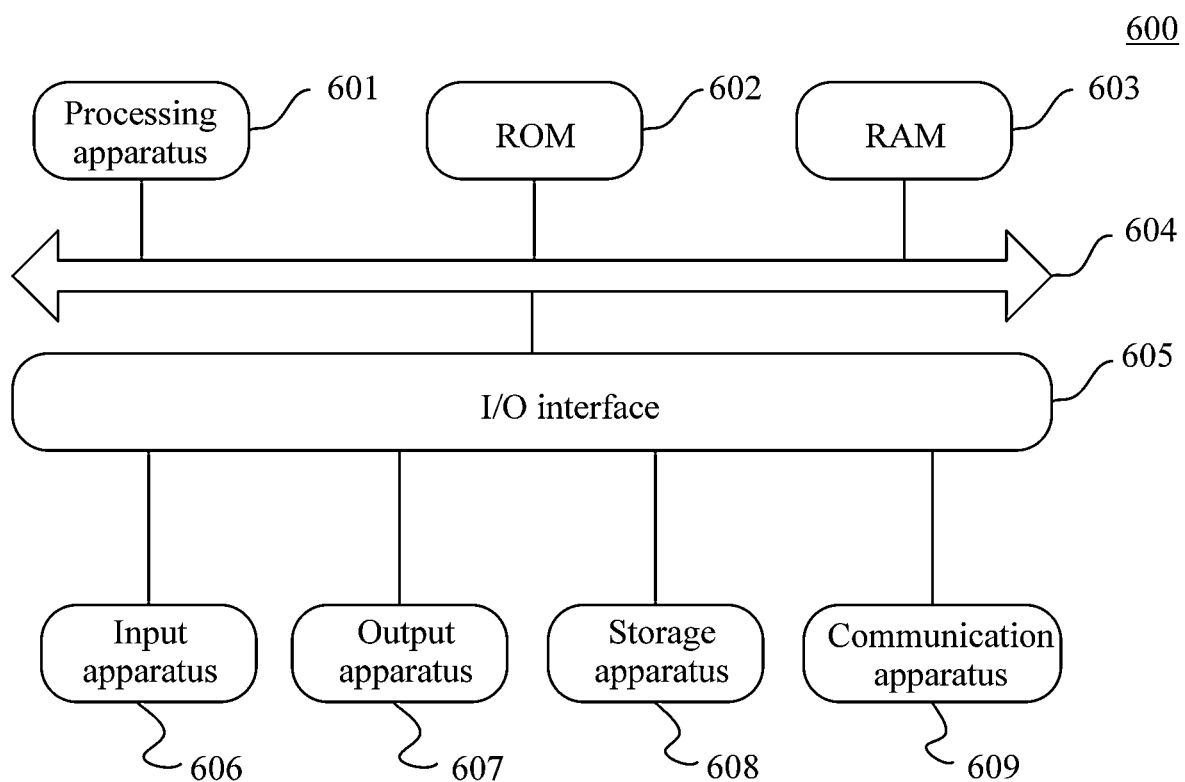
FIG. 6 is a diagram illustrating the internal structure of an electronic device according to an embodiment of the present application.

Referring to FIG. 6, FIG. 6 is a diagram illustrating the structure of an electronic device 600 suitable for implementing the embodiment of the present disclosure. The electronic device in embodiments of the present disclosure may include, mobile terminals such as a mobile phone, a laptop, a digital broadcast receiver, a personal digital assistant (PDA), a portable Android device (PAD), a portable media player (PMP) and an in-vehicle terminal (such as an in-vehicle navigation terminal), and stationary terminals such as a digital television (TV) and a desktop computer. The electronic device shown in FIG. 6 is merely an example.

As shown in FIG. 6, the electronic device 600 may include a processing apparatus 601 (such as a central processing unit or a graphics processor). The processing apparatus 601 may perform various appropriate actions and processing according to a program stored in a read-only memory (ROM) 602 or a program loaded into a random access memory (RAM) 603 from a storage apparatus 608. The RAM 603 also stores various programs and data required for the operation of the electronic device 600. The processing apparatus 601, the ROM 602, and the RAM 603 are connected to each other through a bus 604. An input/output (I/O) interface 605 is also connected to the bus 604.

The apparatus below may be connected to the I/O interface 605. The apparatus includes an input apparatus 606 such as a touch screen, a touch pad, a keyboard, a mouse, a camera, a microphone, an accelerometer and a gyroscope; an output apparatus 607 such as a liquid crystal display (LCD), a speaker and a vibrator; a storage apparatus 608 such as a magnetic tape and a hard disk; and a communication apparatus 609. The communication apparatus 609 may allow the electronic device 600 to perform wireless or wired communication with other devices so as to exchange data. FIG. 6 shows the electronic device 600 having various apparatuses, but it is to be understood that it is not necessary to implement or be equipped with all the shown apparatuses. More or fewer apparatuses may be implemented instead.

According to the embodiment of the present disclosure, the process described above with reference to the flowchart may be implemented as a computer software program. For example, the embodiment of the present disclosure includes a computer program product. The computer program product includes a computer program carried in a non-transitory computer-readable medium. The computer program includes program codes for performing the method shown in the flowchart. In such an embodiment, the computer program may be downloaded from a network and installed through the communication apparatus 609, or may be installed from the storage apparatus 608, or may be installed from the ROM 602. When the computer program is executed by the processing apparatus 601, the preceding functions defined in the method of the embodiments of the present disclosure are performed.

The computer-readable medium described above in the present disclosure may be a computer-readable signal medium or a computer-readable storage medium or any combination thereof. The computer-readable storage medium may be an electrical, magnetic, optical, electromagnetic, infrared, or semiconductor system, apparatus, or device, or any combination thereof. An example of the computer-readable storage medium may include an electrical connection having one or more wires, a portable computer magnetic disk, a hard disk, a RAM, a ROM, an erasable programmable read-only memory (Electrically Programmable Read-Only-Memory (EPROM) or a flash memory), an optical fiber, a portable compact disc read-only memory (CD-ROM), an optical storage device, a magnetic storage device, or any suitable combination thereof. In the present disclosure, the computer-readable storage medium may be any tangible medium including or storing a program. The program may be used by or used in conjunction with an instruction execution system, apparatus, or device. In the present disclosure, the computer-readable signal medium may include a data signal propagated on a baseband or as a part of a carrier, and computer-readable program codes are carried in the data signal. The data signal propagated in this manner may be in multiple forms and includes an electromagnetic signal, an optical signal, or any suitable combination thereof. The computer-readable signal medium may further be any computer-readable medium other than the computer-readable storage medium. The computer-readable signal medium may send, propagate, or transmit a program used by or in conjunction with an instruction execution system, apparatus, or device. The program codes included in the computer-readable medium may be transmitted in any suitable medium, including a wire, an optical cable, a radio frequency (RF), or any suitable combination thereof.

The computer-readable medium may be included in the electronic device or may exist alone without being assembled into the electronic device.

The computer-readable medium carries one or more programs. When executed by the electronic device, the one or more programs cause the electronic device to determine the proportion of the display area of a frozen area to the display area of a table area, where the table area includes the frozen area and a non-frozen area; when the proportion is greater than a proportion threshold, the display area of the frozen area is shrunk on the screen, and the display area of the non-frozen area is enlarged. The proportion of the shrunk display area of the frozen area to the display area of the table area is equal to the proportion threshold.

Computer program codes for performing the operations in the present disclosure may be written in one or more programming languages or combination thereof. The preceding one or more programming languages include object-oriented programming languages such as Java, Smalltalk and C++, as well as conventional procedural programming languages such as C or similar programming languages. The program codes may be executed entirely on a user computer, partly on the user computer, as a stand-alone software package, partly on the user computer and partly on a remote computer, or entirely on the remote computer or a server. In the case relating to the remote computer, the remote computer may be connected to the user computer via any kind of network including a local area network (LAN) or a wide area network (WAN), or may be connected to an external computer (for example, via the Internet through an Internet service provider).

The flowcharts and block diagrams in the drawings show possible architectures, functions and operations of the system, method and computer program product according to a plurality of embodiments of the present disclosure. In this regard, each block in a flowchart or block diagram may represent a module, a program segment, or part of codes that contains one or more executable instructions for implementing specified logical functions. It is also to be noted that in some alternative implementations, the functions in the blocks may occur in sequences different from those shown in the drawings. For example, two successive blocks may in fact be executed substantially in parallel or in a reverse order, which depends on the functions involved. It is also to be noted that each block in the block diagrams and/or flowcharts and a combination of blocks in the block diagrams and/or flowcharts may be implemented by a specific-purpose hardware-based system which performs specified functions or operations or a combination of specific-purpose hardware and computer instructions.

The functions described above herein may be performed, at least partially, by one or more hardware logic components. For example, exemplary types of hardware logic components that may be used include: a field programmable gate array (FPGA), an application specific integrated circuit (ASIC), application specific standard product (ASSP), a system on a chip (SOC), a complex programmable logic device (CPLD) and the like.

In the context of the present disclosure, a machine-readable medium may be a tangible medium that may include or store a program that is used by or in conjunction with an instruction execution system, apparatus or device.

The machine-readable medium may be a machine-readable signal medium or a machine-readable storage medium. The machine-readable medium may include an electronic, magnetic, optical, electromagnetic, infrared or semiconductor system, apparatus or device, or any suitable combination thereof. Examples of the machine-readable storage medium may include an electrical connection based on one or more wires, a portable computer disk, a hard disk, RAM, ROM, EPROM (or a flash memory), an optical fiber, CD-ROM, an optical storage device, a magnetic storage device, or any appropriate combination thereof.

The table processing apparatus, the electronic device, and the storage medium according to the preceding embodiments can execute the table processing method according to any embodiment of the present disclosure and have function modules corresponding to this method. For technical details not described in detail in the preceding embodiments, see the table processing method provided in any embodiment of the present application.

According to one or more embodiments of the present disclosure, a table processing method is provided. The method includes determining the proportion of the display area of a frozen area to the display area of a table area, where the table area includes the frozen area and a non-frozen area; and when the proportion is larger than a proportion threshold, shrinking the display area of the frozen area and enlarging the display area of the non-frozen area, where the proportion of the shrunk display area of the frozen area to the display area of the table area is equal to the proportion threshold.

According to one or more embodiments of the present disclosure, a preceding table processing method is provided. The method further includes moving the divider line between the display area of the frozen area and the display area of the non-frozen area from a first position in the display area of the table area to a second position in the display area of the table area; and adjusting the display area of the frozen area and the display area of the non-frozen area according to the moved divider line, where the first position is a position corresponding to the proportion, and the second position is a position corresponding to the proportion threshold.

According to one or more embodiments of the present disclosure, a preceding table processing method is provided. The display area of the frozen area includes a scrollbar. The method further includes monitoring the movement operation of the scrollbar, and in the display area of the frozen area, correspondingly displaying, according to the movement operation, the content contained in the frozen area.

According to one or more embodiments of the present disclosure, a preceding table processing method is provided. The method further includes acquiring an input unfreezing instruction; and according to the unfreezing instruction, unfreezing the frozen area.

According to one or more embodiments of the present disclosure, a preceding table processing method is provided. The method further includes, when an instruction to close the target table is monitored, freezing the frozen area which is unfrozen again.

According to one or more embodiments of the present disclosure, a preceding table processing method is provided. The method further includes, when the proportion is less than or equal to the proportion threshold, the display area of the frozen area and the display area of the non-frozen area being not changed in size.

According to one or more embodiments of the present disclosure, a preceding table processing method is provided. The method further includes determining the proportion of the display area of the frozen area to the display area of the table area according to the number of lines included in the display area of the frozen area and the number of lines included in the display area of the table area, where the number of lines is the number of rows or the number of columns.

According to one or more embodiments of the present disclosure, a table processing apparatus is provided. The device includes a determination module and a first processing module. The determination module is configured to determine the proportion of the display area of a frozen area to the display area of a table area, where the table area includes the frozen area and a non-frozen area. The first processing module is configured to, when the proportion is larger than a proportion threshold, shrink the display area of the frozen area and enlarge the display area of the non-frozen area, where the proportion of the shrunk display area of the frozen area to the display area of the table area is equal to the proportion threshold.

According to one or more embodiments of the present disclosure, an electronic device is provided. The device includes a memory and a processor. The memory is configured to store a computer program. The processor, when executing the computer program, implements the following steps: determining the proportion of the display area of a frozen area to the display area of a table area, where the table area includes the frozen area and a non-frozen area; and when the proportion is larger than a proportion threshold, shrinking the display area of the frozen area and enlarging the display area of the non-frozen area, where the proportion of the shrunk display area of the frozen area to the display area of the table area is equal to the proportion threshold.

According to one or more embodiments of the present disclosure, a computer-readable storage medium which is configured to store a computer program is provided. When executed by a processor, the computer program implements the following steps: determining the proportion of the display area of a frozen area to the display area of a table area, where the table area includes the frozen area and a non-frozen area; and when the proportion is larger than a proportion threshold, shrinking the display area of the frozen area and enlarging the display area of the non-frozen area, where the proportion of the shrunk display area of the frozen area to the display area of the table area is equal to the proportion threshold.

In addition, although the operations are depicted in a particular order, this should not be construed as requiring that such operations should be performed in the particular order shown or in a sequential order. In certain circumstances, multitasking and parallel processing may be advantageous. Some features described in the context of separate embodiments may also be implemented in combination in a single embodiment. Various features described in the context of a single embodiment may also be implemented in a plurality of embodiments, individually or in any suitable sub-combination.

What is claimed is:

1. A table processing method, comprising:
   determining a proportion of a display area of a frozen area to a display area of a table area, wherein the table area comprises the frozen area and a non-frozen area;
   in a case where the proportion is larger than a proportion threshold, shrinking the display area of the frozen area and enlarging a display area of the non-frozen area so that the proportion of the display area of the frozen area to the display area of the table area is equal to the proportion threshold, wherein the proportion threshold is a preset threshold of the proportion of the display area of the frozen area to the display area of the table area;

acquiring an input unfreezing instruction;

unfreezing the frozen area according to the unfreezing instruction; and in a case where an instruction to close a target table is monitored, freezing the frozen area which is unfrozen again.

2. The method of claim 1, wherein shrinking the display area of the frozen area and enlarging the display area of the non-frozen area comprise:

moving a divider line between the display area of the frozen area and the display area of the non-frozen area from a first position in the display area of the table area to a second position in the display area of the table area, wherein the first position is a position corresponding to the proportion, and the second position is a position corresponding to the proportion threshold; and adjusting the display area of the frozen area and the display area of the non-frozen area according to the moved divider line.

3. The method of claim 2, wherein the display area of the frozen area comprising a scrollbar, and the method further comprising:

monitoring a movement operation of the scrollbar, and in the display area of the frozen area, correspondingly displaying, according to the movement operation, content contained in the frozen area.

4. The method of claim 3, wherein in a case where the proportion is less than or equal to the proportion threshold, the display area of the frozen area and the display area of the non-frozen area are not changed in size.

5. The method of claim 3, wherein determining the proportion of the display area of the frozen area to the display area of the table area comprises:

determining the proportion of the display area of the frozen area to the display area of the table area according to a number of lines comprised in the display area of the frozen area and a number of lines comprised in the display area of the table area, wherein the number of lines is a number of rows or a number of columns.

6. The method of claim 2, wherein in a case where the proportion is less than or equal to the proportion threshold, the display area of the frozen area and the display area of the non-frozen area are not changed in size.

7. The method of claim 2, wherein determining the proportion of the display area of the frozen area to the display area of the table area comprises:

determining the proportion of the display area of the frozen area to the display area of the table area according to a number of lines comprised in the display area of the frozen area and a number of lines comprised in the display area of the table area, wherein the number of lines is a number of rows or a number of columns.

8. The method of claim 1, wherein the frozen area is a data area selected from the table area by a user, and the display area of the table area is an area of the table area currently displayed in a screen.

9. The method of claim 1, wherein in a case where the proportion is less than or equal to the proportion threshold, the display area of the frozen area and the display area of the non-frozen area are not changed in size.

10. The method of claim 1, wherein determining the proportion of the display area of the frozen area to the display area of the table area comprises:

determining the proportion of the display area of the frozen area to the display area of the table area according to a number of lines comprised in the display area of the frozen area and a number of lines comprised in the display area of the table area, wherein the number of lines is a number of rows or a number of columns.

11. An electronic device, comprising a memory and a processor, wherein the memory is configured to store a computer program, and when executing the computer program, the processor implements steps of a table processing method;

wherein the table processing method comprises:

determining a proportion of a display area of a frozen area to a display area of a table area, wherein the table area comprises the frozen area and a non-frozen area;

in a case where the proportion is larger than a proportion threshold, shrinking the display area of the frozen area and enlarging a display area of the non-frozen area so that the proportion of the display area of the frozen area to the display area of the table area is equal to the proportion threshold, wherein the proportion threshold is a preset threshold of the proportion of the display area of the frozen area to the display area of the table area;

acquiring an input unfreezing instruction;

unfreezing the frozen area according to the unfreezing instruction; and in a case where an instruction to close a target table is monitored, freezing the frozen area which is unfrozen again.

12. The electronic device of claim 11, wherein shrinking the display area of the frozen area and enlarging the display area of the non-frozen area comprise:

moving a divider line between the display area of the frozen area and the display area of the non-frozen area from a first position in the display area of the table area to a second position in the display area of the table area, wherein the first position is a position corresponding to the proportion, and the second position is a position corresponding to the proportion threshold; and adjusting the display area of the frozen area and the display area of the non-frozen area according to the moved divider line.

13. The electronic device of claim 12, wherein the display area of the frozen area comprising a scrollbar, and the method further comprising:

monitoring a movement operation of the scrollbar, and in the display area of the frozen area, correspondingly displaying, according to the movement operation, content contained in the frozen area.

14. A non-transitory computer-readable storage medium, which is configured to store a computer program, wherein when executed by a processor, the computer program causes the processor to implement a table processing method;

wherein the table processing method comprises:

determining a proportion of a display area of a frozen area to a display area of a table area, wherein the table area comprises the frozen area and a non-frozen area;

in a case where the proportion is larger than a proportion threshold, shrinking the display area of the frozen area and enlarging a display area of the non-frozen area so that the proportion of the display area of the frozen area to the display area of the table area is equal to the proportion threshold, wherein the proportion threshold is a preset threshold of the proportion of the display area of the frozen area to the display area of the table area, acquiring an input unfreezing instruction;
unfreezing the frozen area according to the unfreezing instruction; and
in a case where an instruction to close a target table is monitored, freezing the frozen area which is unfrozen again.

* * * * *